United States Patent [19]

Iyengar et al.

[11] Patent Number: 5,669,014

[45] Date of Patent: Sep. 16, 1997

[54] SYSTEM AND METHOD HAVING PROCESSOR WITH SELECTABLE BURST OR NO-BURST WRITE BACK MODE DEPENDING UPON SIGNAL INDICATING THE SYSTEM IS CONFIGURED TO ACCEPT BIT WIDTH LARGER THAN THE BUS WIDTH

[75] Inventors: Sundaravarathan R. Iyengar, San Jose; Mustafiz R. Choudhury, Sunnyvale, both of Calif.

[73] Assignee: Intel Corporation, Santa Clara, Calif.

[21] Appl. No.: 297,487

[22] Filed: Aug. 29, 1994

[51] Int. Cl.⁶ .................................................. C06F 13/00
[52] U.S. Cl. ........................ 395/842; 395/886; 711/143
[58] Field of Search ................................ 395/290, 500, 395/425, 842, 845, 886, 470, 800

[56] References Cited

U.S. PATENT DOCUMENTS

| | | | |
|---|---|---|---|
| 4,677,548 | 6/1987 | Bradley | 364/200 |
| 5,101,498 | 3/1992 | Ehlig et al. | 395/800 |
| 5,146,582 | 9/1992 | Begun | 395/500 |
| 5,247,643 | 9/1993 | Shottan | 395/425 |
| 5,262,990 | 11/1993 | Mills et al. | 365/189.02 |
| 5,375,216 | 12/1994 | Moyer et al. | 395/421 |
| 5,469,544 | 11/1995 | Aatresh et al. | 395/290 |

*Primary Examiner*—Thomas C. Lee
*Assistant Examiner*—P. Dinh
*Attorney, Agent, or Firm*—Blakely, Sokoloff, Taylor & Zafman

[57] ABSTRACT

A processor for processing information is described. The processor can select between a write-burst mode of transferring information and an individual write cycle mode of transferring information. The write-burst mode of transferring information is a transfer of information in a single burst transaction and the individual write cycle mode of transferring information is a transfer of information in separate write cycles.

5 Claims, 8 Drawing Sheets

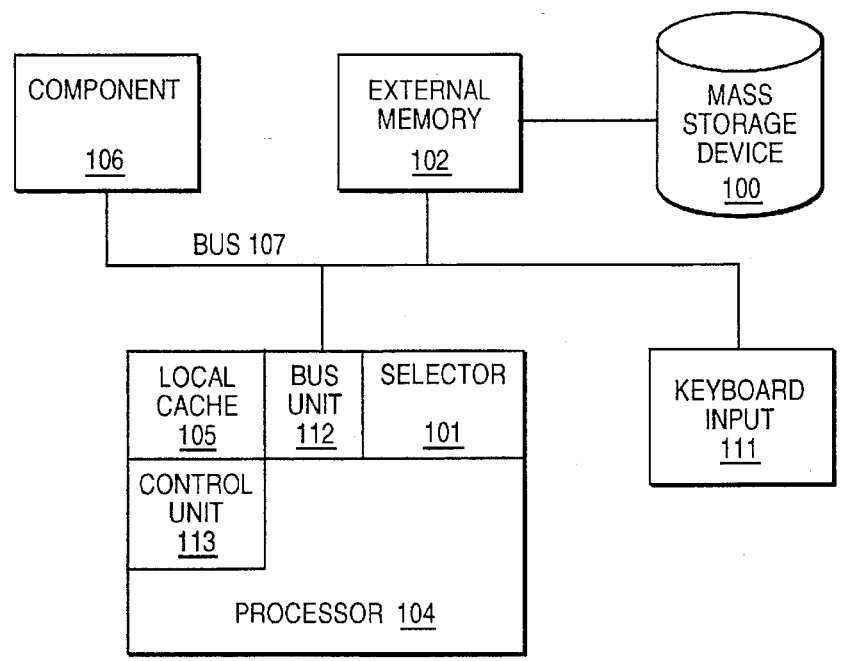
FIG_1
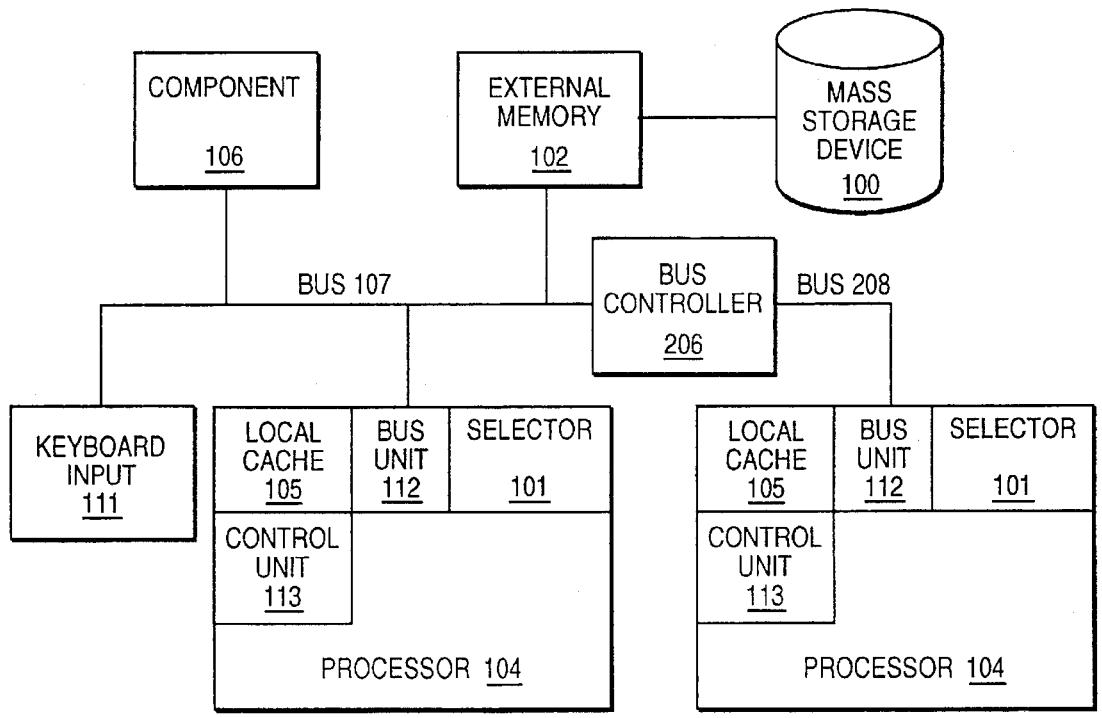
FIG_2

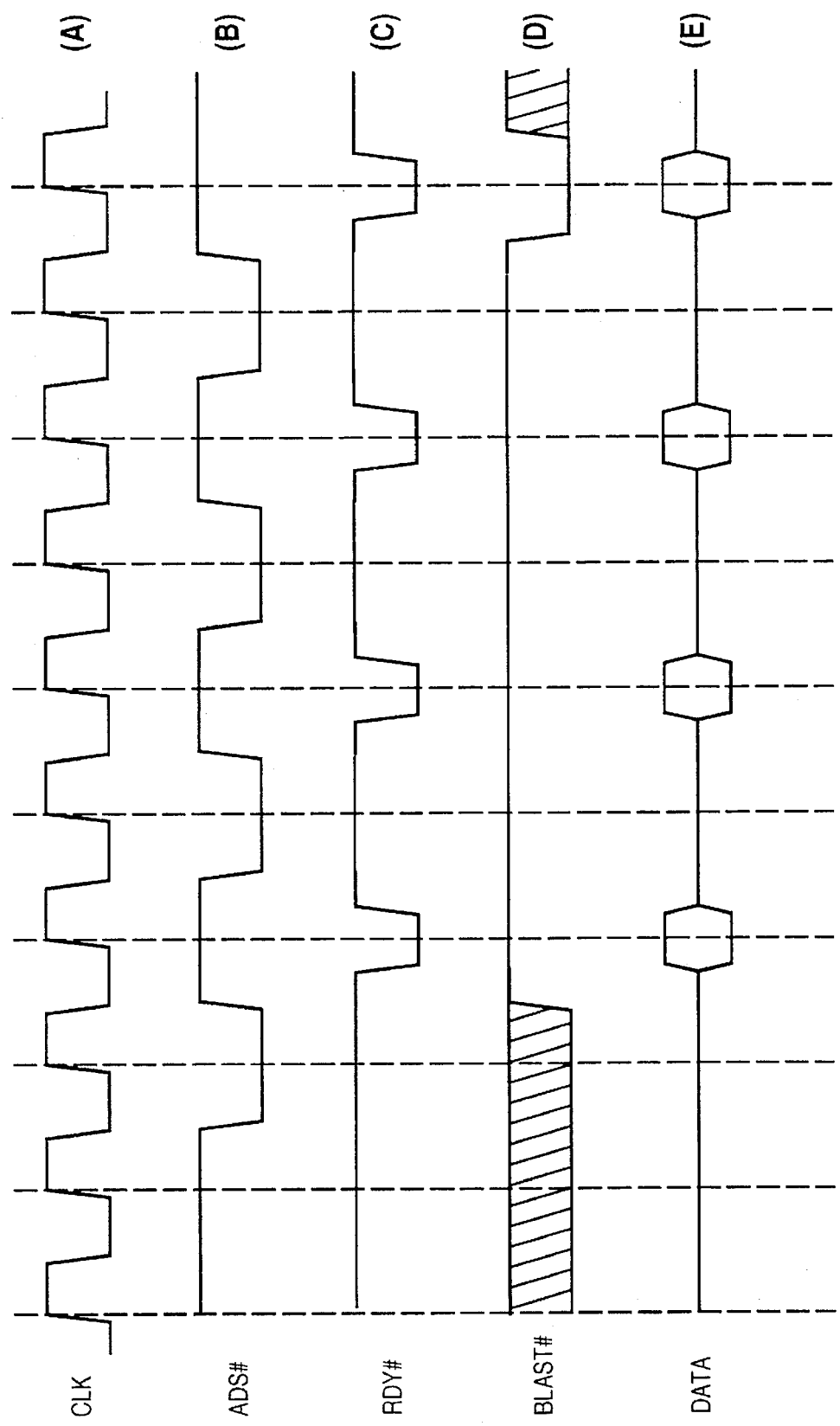
FIG_3

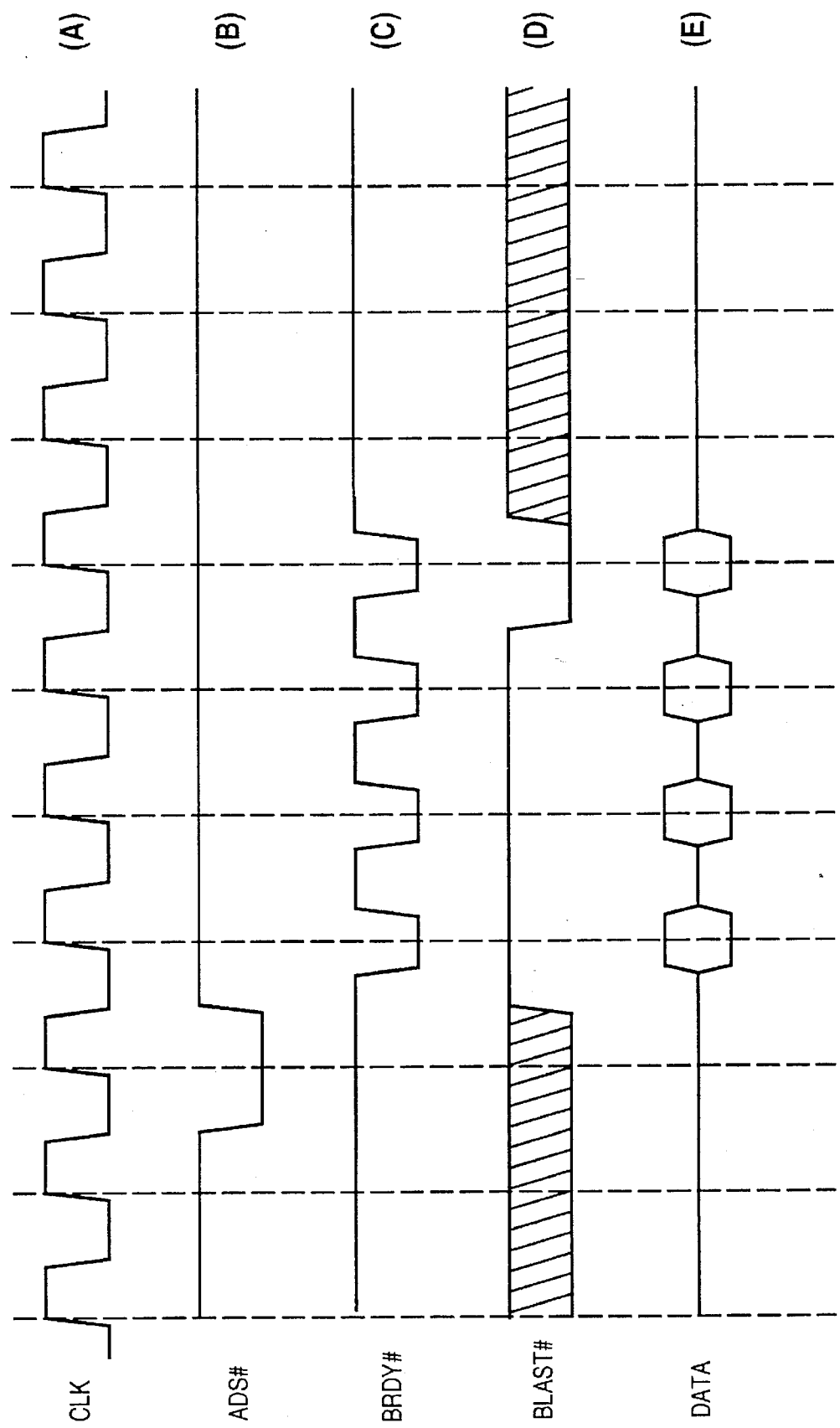

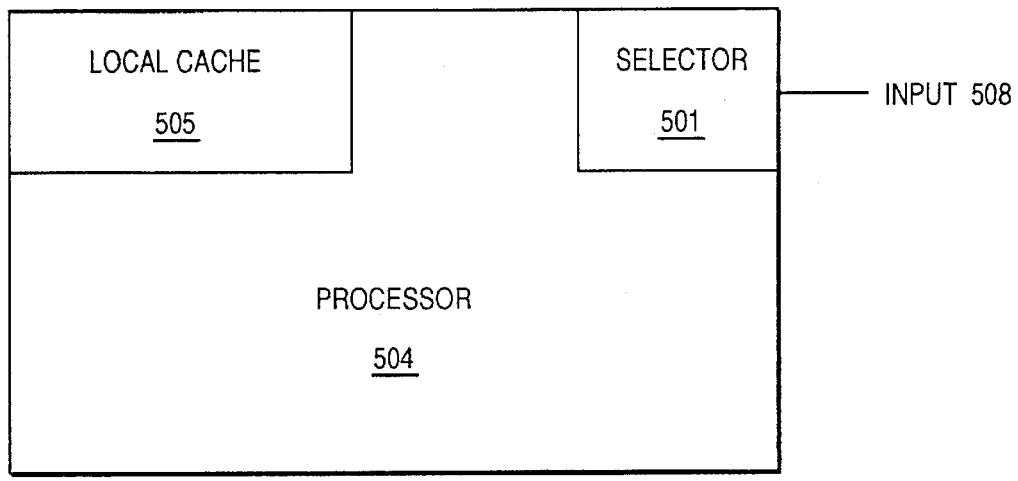
FIG_5
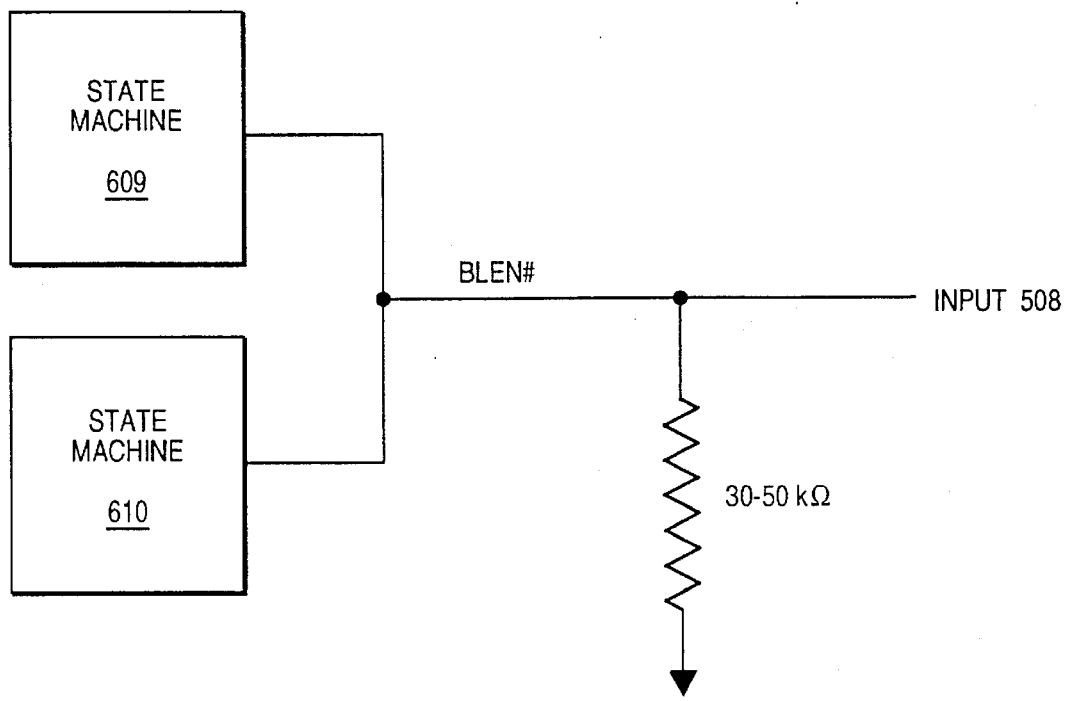
FIG_6

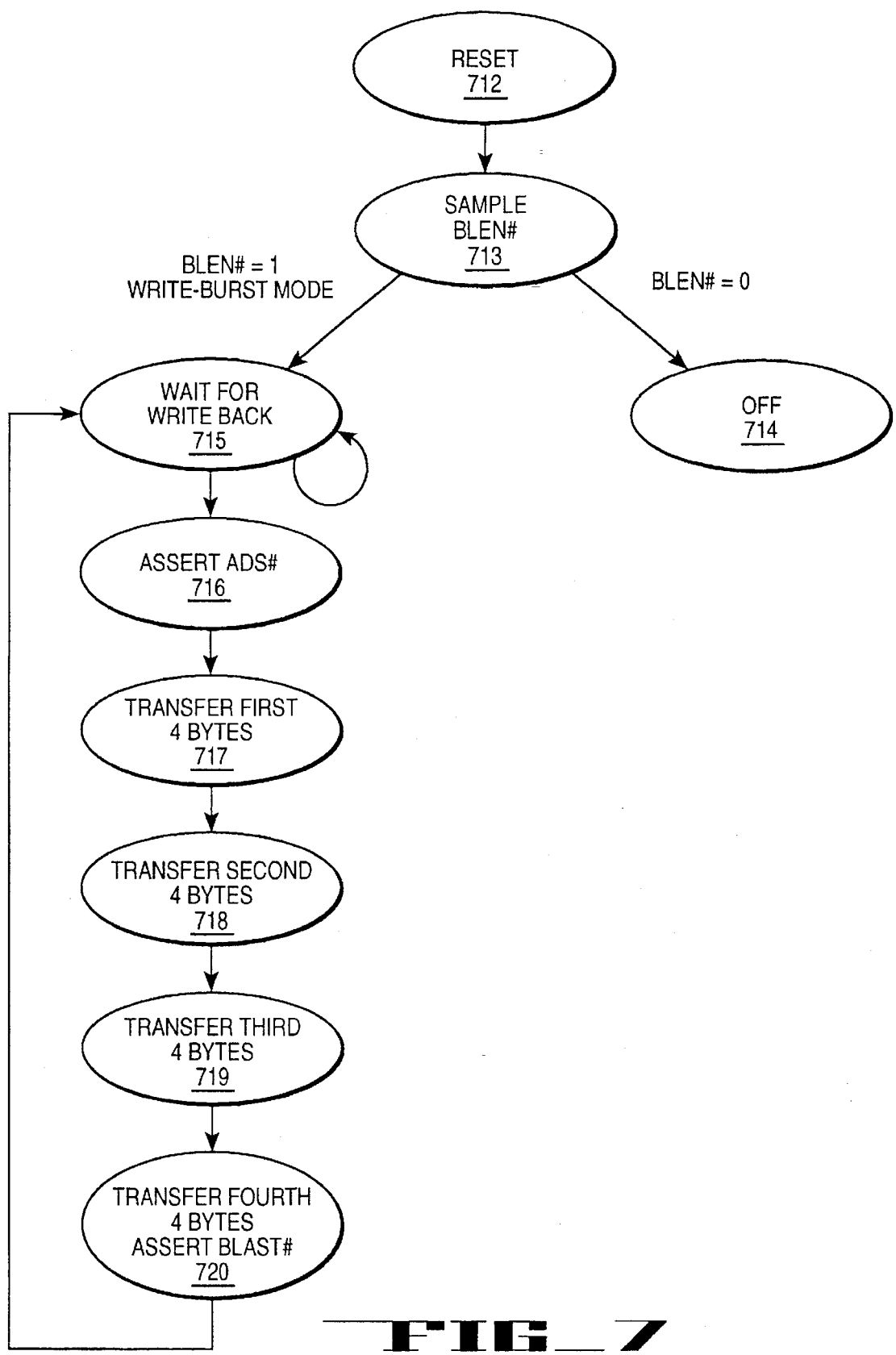
FIG_7

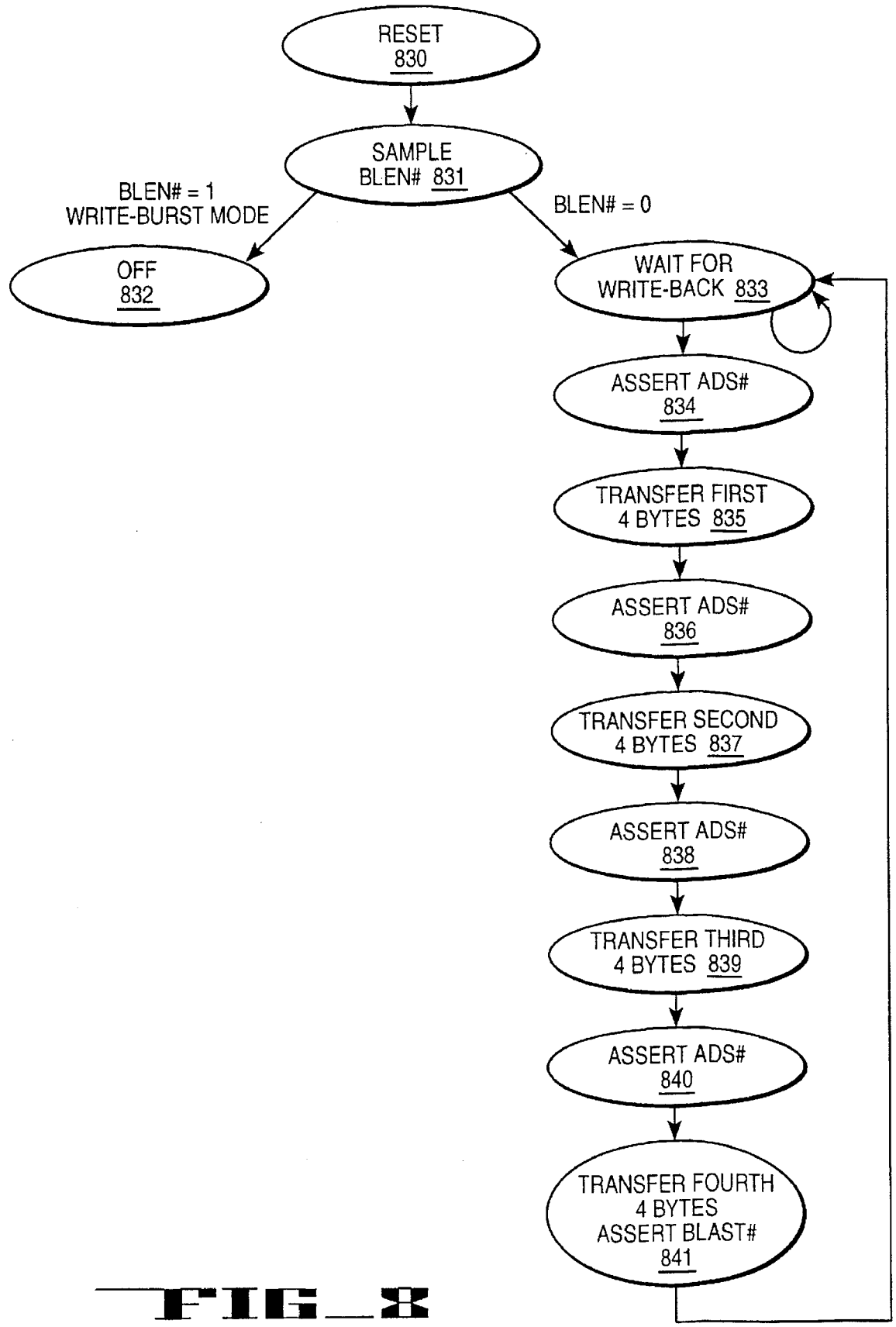
FIG_8

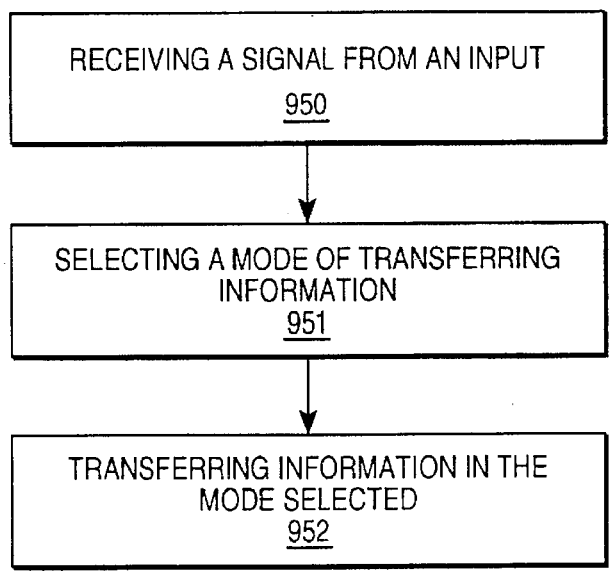
FIG_9
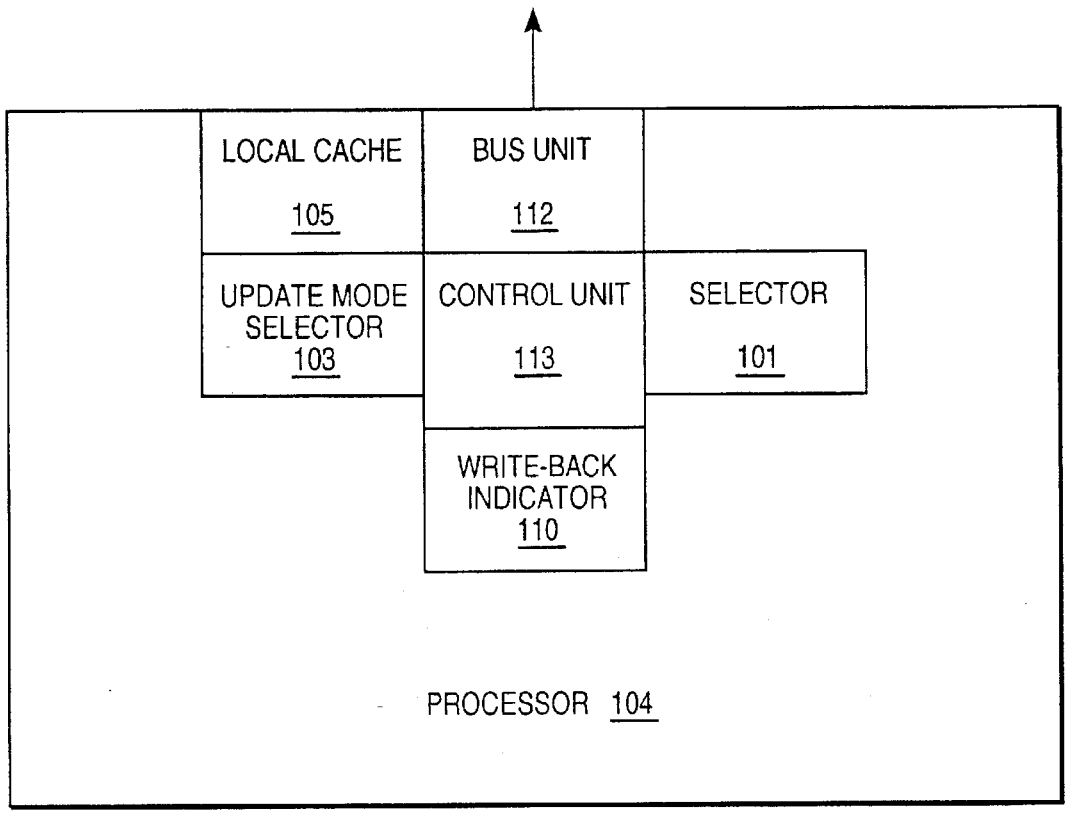
FIG_10

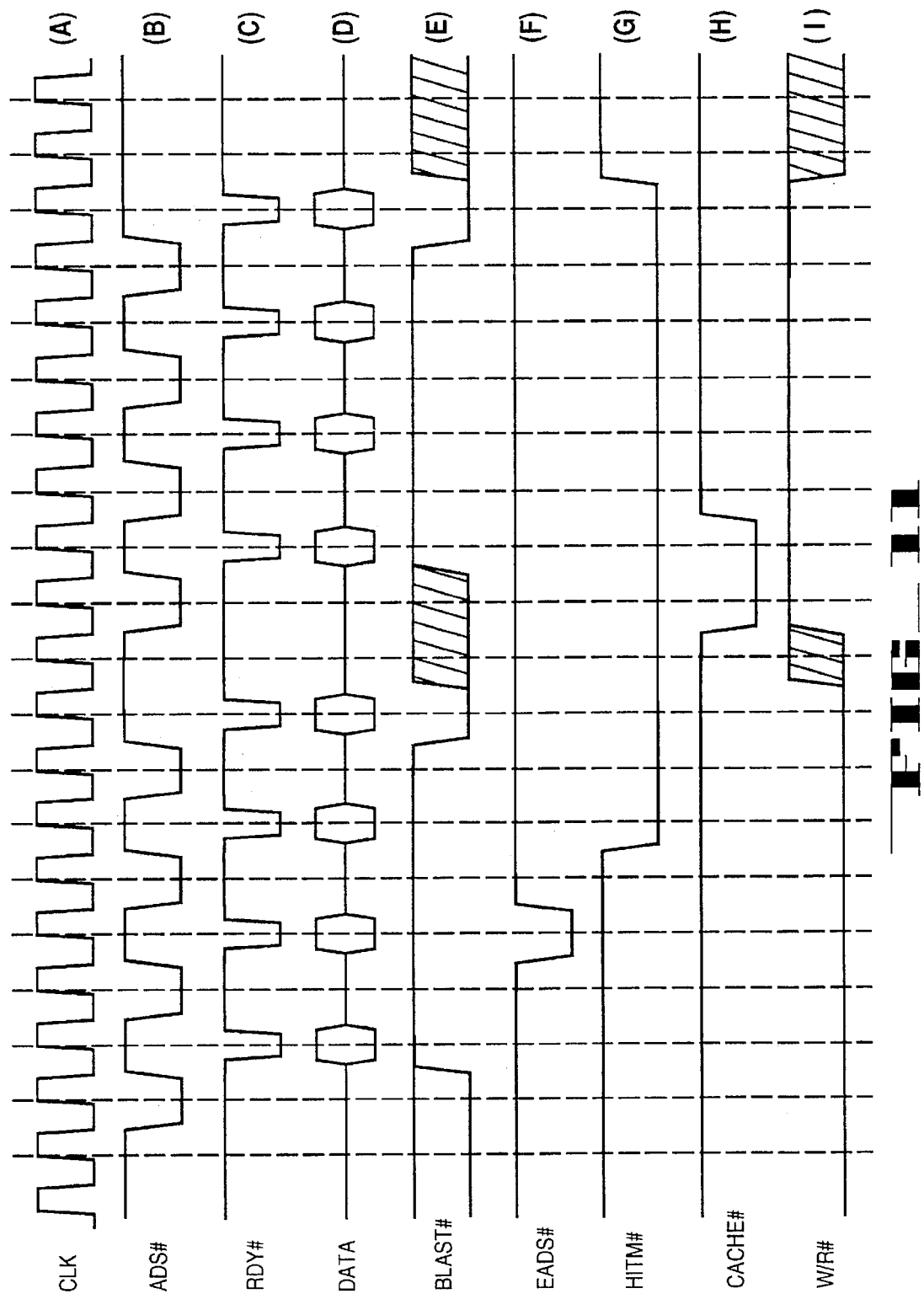
FIG—11

SYSTEM AND METHOD HAVING PROCESSOR WITH SELECTABLE BURST OR NO-BURST WRITE BACK MODE DEPENDING UPON SIGNAL INDICATING THE SYSTEM IS CONFIGURED TO ACCEPT BIT WIDTH LARGER THAN THE BUS WIDTH

FIELD OF THE INVENTION

The present invention relates to the field of electronic data processing devices. More particularly, the present invention relates to the transfer of information between a data processor and various peripheral devices.

BACKGROUND OF THE INVENTION

One prior processor transfers information utilizing a non-burst mode. More specifically, the prior processor transfers information that is longer than the capacity of the bus by using multiple individual write cycles. Existing computer systems designed for a processor with no write-burst capability contains components like a chipset which will only operate properly with non-burst processors. Write-burst capability is the ability to transfer information that is longer than the capacity of the bus by using a single elongated write cycle. When a processor with write-burst capability is inserted into such a system, the chipset will not accept a write-burst transfer and can cause the entire system to malfunction. However, the system can be modified to accept a write-burst capable processor by replacing some components of the chipset and other incompatible components. Write-burst capable processors are desirable because of the greater performance of the processor in accomplishing data transfer.

Sometimes it is desirable to replace a processor in an existing system with a new processor to utilize new features and advancements in processor technology. But not all prior systems can be modification, to accept write-burst capable processors; without the modification, the prior processor can only be replaced with a non-burst processor. Thus, two different processors are required, one for non-burst systems and one for write-burst systems. However, maintaining a product line with two different processors both performing essentially the same function has significant associated costs.

Thus, what is needed is a processor that selects between a write-burst mode and a non-burst mode of transferring information. In this manner, the processor can transfer information in a write-burst mode for use in systems that accept write-bursting and can also transfer information in a non-burst mode for use in systems that accept non-burst cycles only.

SUMMARY OF THE INVENTION

A processor capable of selecting between a write-burst mode of transferring information and a non-burst mode of transferring information is described. The write-burst mode of transferring information is a transfer of information in a single burst transaction and the non-burst mode of transferring information is a transfer of information in separate write cycles. The processor comprises of a bus unit for receiving information from an external bus, a cache memory for storing information, a control unit for transferring information in a write-burst mode and in a non-burst mode, and a selector for selecting between the write-burst mode of transferring information and the non-burst mode of transferring information. The processor can receive a first signal state and a second signal state. The first signal state corresponds to the write-burst mode and the second signal state corresponds to the non-burst mode. Under a first embodiment, the processor selects between write-burst mode and non-burst mode only for write-back cycles.

BRIEF DESCRIPTION OF THE DRAWINGS

FIG. 1 illustrates in block diagram form a computer system of one embodiment of the present invention.

FIG. 2 illustrates in block diagram form a computer system of a second embodiment of the present invention.

FIG. 3 illustrates in the form of a timing diagram the non-burst mode of transferred data.

FIG. 4 illustrates in the form of a timing diagram the write-burst mode of transferring data.

FIG. 5 illustrates in block diagram form a processor of a third embodiment of the present invention.

FIG. 6 illustrates in circuit diagram form the selector of FIG. 5.

FIG. 7 illustrates in state diagram form the operation of the first state machine of FIG. 6.

FIG. 8 illustrates in state diagram form the operation of the second state machine of FIG. 6.

FIG. 9 illustrates in flow chart diagram form the operation of the processor a fourth embodiment of the present invention.

FIG. 10 illustrates in block diagram form a processor of a seventh embodiment of the present invention.

FIG. 11 illustrates in timing diagram form the operation of a processor of an eighth and ninth embodiments of the present invention.

DETAILED DESCRIPTION

A novel processor having a selector for selecting a mode of transferring information is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates in block diagram form a computer system of one embodiment of the present invention. The computer system includes mass storage device 100, external memory 102, keyboard input 111 and processor 104. The computer system can also include external component 106 and a bus 107. Keyboard input 111 allows a keyboard to be coupled to the computer system. External memory 102 can be a random access memory (RAM) or a cache memory. Mass storage device 100 can be a hard disk drive, floppy disk drive, CD-ROM drive or a flash memory device. Mass storage device 100 is coupled to external memory 102 and external memory 102 is in turn coupled to bus 107. Processor 104 is also coupled to bus 107 and transfers information to external memory 102 and component 106 via bus 107. External memory 102 and component 106 also transfers information to processor 104 via bus 107.

Processor 104 includes selector 101, local cache 105, bus unit 112 and control unit 113. Selector 101 selects between a write-burst mode of transferring information and a non-burst mode of transferring information from processor to external memory. When selector 101 selects a write-burst mode of transferring information, processor 104 transfers information to external memory 102 or component 106 in a single burst transaction. When selector 101 selects a non-burst mode of transferring information, processor 104 transfers information to external memory 102 or component 106 in separate write cycles. Thus, processor 104 can be used in both a non-burst system or a write-burst system. Selector 101 merely selects the appropriate mode for transferring information. A non-burst computer system can be modified to a write-burst system by utilizing processor 104 and replacing some components of the chipset. Other components such as the secondary or level two (L2) cache (for example, part number 82485 manufactured by Intel Corporation) can remain in the modified system resulting in cost savings. Selector 101 can reside in control unit 113 or can reside separately from control trait 113 in processor 104. Bus unit 112 transmits data, addresses, and control signals over bus 107. It also receives data, addresses, and control signals from bus 107. Control unit 113 controls and synchronizes all data transfers and transformations in processor 104.

FIG. 2 illustrates in block diagram form a computer system of a second embodiment of the present invention. The computer system of FIG. 2 is similar to the computer system of FIG. 1 except it includes multiple processors. It also comprises of bus controller 206 to control bus 107 and bus 208. Each processor 104 includes a selector 101. Each selector 101 selects either a write-burst mode of transferring information or a non-burst mode of transferring information for its processor. The processor then transfers information in accordance with the selected mode. In most instances, the mode selected for one processor is the same mode selected for the other processor. This occurs because the conditions leading to the selection of one mode for one processor usually applies for other processors as well.

FIG. 3 illustrates in the form of a timing diagram the non-burst mode of transferring data. In the non-burst mode, the processor transfers data in separate write cycles. Each write cycle is independent and distinct from the other. The number of write cycles necessary to accomplish the transfer depends on the size of data being transferred and the size of data transferred in each write cycle. For instance, if 16 bytes is to be transferred by the processor and each write cycle transfers four bytes, then four write cycles are required to transfer the entire 16 bytes of information.

The processor initiates the transfer of data in this mode by first asserting an address status signal (ADS#) which occupies one clock period and indicates that a valid bus cycle definition and address are available on the cycle definition lines and address bus. Examples of bus cycle definition signals include a signal (M/IO#) to indicate whether the existing cycle is a memory or input-output, a signal (D/C#) to indicate whether the existing cycle is a data or control cycle and a signal (W/R#) to indicate whether the existing cycle is a write or read cycle. Other bus cycle definition signals include a signal (PLOCK#) indicating that the current bus transaction requires more than one bus cycle to complete, and a signal (LOCK#) indicating that the current bus cycle is locked. Because the ADS# signal is an active low signal, the processor asserts the signal by transmitting a low signal state. After the processor asserts the ADS# signal, it transfers data for one write cycle which also occupies one clock period. Then the processor asserts another ADS# signal and transfers data for another write cycle. The steps are repeated until completion of data transfer. In the example described above, the processor transfers four bytes in each write cycle. Four write cycles are required to transfer the total of 16 bytes. Since four write cycles are required, the processor asserts four ADS# signals each occupying one clock period. It also transfers data four times each also requiring one clock period. Thus, the processor utilizes a minimum of eight clock times to complete the transfer of 16 bytes.

FIG. 4 illustrates in the form of a timing diagram the write-burst mode of transferring data. In the write-burst mode, the processor transfers data in a single burst transaction. The processor initiates the single burst transaction by asserting an ADS# signal. The assertion of the ADS# signal occupies one clock period as in the non-burst mode. After the processor asserts the ADS# signal, it transfers data. However, the transfer of data may be broken into separate increments depending on the total size of data transferred and the size of data transferred in each increment. Each transfer of a data increment requires one clock period. Using the example described above, a transfer of 16 bytes with four bytes transferred per increment requires four increments as illustrated in FIG. 4. However, unlike in the non-burst mode, the processor only asserts one ADS# signal at the beginning of the burst transaction. After the ADS# single, the processor transfers data in four increments of four bytes each. Thus, the processor utilizes a minimum of five clock periods to complete the transfer of 16 bytes. It is to be appreciated that the write-burst mode can result in savings of clock periods especially for larger data transfers. In this example, the non-burst mode consumes eight clock periods and thus, utilizing the write-burst mode results in savings of three clock periods.

FIG. 5 illustrates in block diagram form a processor of a third embodiment of the present invention. Processor 504 includes selector 501 and input 508. Input 508 is coupled to selector 501 and receives external signals in the form of signal states. One signal state transmitted through input 508 to selector 501 indicates to selector 501 to select a write-burst mode of transferring information. A second signal state transmitted through input 508 to selector 501 indicates to selector 501 to select a non-burst mode of transferring information. The first signal state can be generated by coupling input 508 to a first voltage potential and the second signal state can be generated by coupling input 508 to a second voltage potential. Under an alternative embodiment, input 508 can be coupled to a pin thus, providing a link for external devices to supply input signals to selector 501.

The transfer of information by processor 504 can occur during write-back cycles. During normal operation, processor 504 stores information in local cache 505. A write-back occurs when processor 504 needs to remove information from local cache 505 to create memory space in local cache 505 or when processor 504 needs to update information in external memory using the information in local cache 505. Under an alternative embodiment, processor 504 performs the write-back function in accordance with the selection made by selector 501. Thus, processor 504 performs the write-back in either the write-burst mode or non-burst mode depending on the selection made by selector 501.

FIG. 6 illustrates in circuit diagram form the selector of FIG. 5. The selector comprises of input 508, a pull-down resistor, state machine 609 and state machine 610. Input 508 is coupled to the pull-down resistor and the pull-down resistor in turn is coupled to ground. In this embodiment, the pull-down resistor has a resistance of 30–50 kiloohms. Input 508 is also coupled to state machine 609 and state machine 610. In this embodiment, the first signal state is a high voltage potential of five volts and the second signal state is a low voltage potential of zero volts or ground potential. When a first signal state is transmitted though input 508, state machine 609 and state machine 610 both see a high voltage potential. In response to the high voltage potential, state machine 609 is activated and transfers information from the processor in a write-burst mode. State machine 610 on the other hand, is deactivated by a high voltage potential. When a second signal state is transmitted through input 508, state machine 609 and state machine 610 sees a low voltage potential. Under a low voltage potential, state machine 609 is deactivated. But, state machine 610 is activated and transfers information from the processor in a non-burst mode. When neither a first signal state nor a second signal state is transmitted through input 508 and input 508 is left floating, the pull-down resistor acts to pull the BLEN# line to a low potential. In this case, state machine 609 and state machine 610 both see a low potential. As described above, state machine 609 is deactivated but state machine 610 is activated and transfers information from the processor in a non-burst mode.

FIG. 7 illustrates in state diagram form the operation of the first state machine of FIG. 6. When the processor is powered up, it powers up in the RESET mode as shown in state 712. State machine 609 then transitions to state 713 where it samples the BLEN# line. If BLEN# line is at a low potential, state machines 609 transitions to OFF state 714 where it is deactivated. On the other hand, if the BLEN# is at a high potential, the processor enters the write-burst mode and state machine 609 transitions to state 715. In state 715, state machine 609 waits for the initiation of a write-back cycle. When a write-back cycle occurs, state machine 609 transitions to state 716. State machine 609 begins the write cycle by asserting an ADS# signal. State machine 609 then transitions to state 717 where it transfers the first four bytes of the write-back. State machine 609 then transitions to state 718 where it transfers the second four bytes of the write-back. State machine 609 then transitions to state 719 where it transfers the third four bytes of the write-back. After state 719, state machine 609 transitions to state 720 where it transfers the fourth four bytes of the write-back. After the last four bytes is transferred, state machine 609 transitions back to state 715 where it waits for the next write-back cycle.

FIG. 8 illustrates in state diagram form the operation of the second state machine of FIG. 6. When the processor is powered up, state machine 610 powers up in the RESET mode as shown in state 830. State machine 610 then transitions to state 831 where it samples the BLEN# line. If the BLEN# line is at a high voltage potential, the processor transfers information in a write-burst mode and state machine 610 transitions to OFF state 832 where it is deactivated. On the other hand, if the BLEN# line is at a low potential, the processor transfers information in a non-burst mode and state machine 610 transitions to state 833. In state 833, state machine 610 waits for the initiation of the write-back cycle. When the processor is ready to perform a write-back cycle, state machine 610 transitions to state 839 and begins the write-back cycle by asserting an ADS# signal. State machine 610 then transitions to state 835 where it transfers the first four bytes of the write-back cycle. It then transitions to state 836 where it asserts the second ADS# signal. State machine 610 then transitions to state 837 where it transfers the second four bytes of the write-back cycle. After state 837, state machine 610 transitions to state 838 where it asserts the third ADS# signal. After the third ADS# signal, state machine 610 transitions to state 839 where it transfers the third four bytes of the write-back cycle. After state 839, state machine 610 transitions to state 840 where it asserts the fourth ADS# signal and transitions to state 841 where it transfers the fourth four bytes of the write-back cycle. Afterwards, state machine 610 transitions back to state 833 where it waits for the next write-back cycle.

FIG. 9 illustrates in flow chart diagram form the operation of the processor of a fourth embodiment of the present invention. In this embodiment, as shown in block 950, the processor first receives a signal from an input indicating one of a plurality of possible modes of transferring information. The possible modes can be a write-burst mode and a non-burst mode or other combinations of other modes. After receiving the signal, the processor selects the mode of transferring information indicated by the signal as shown in block 951. The processor can select between a write-burst mode or a non-burst mode or other combinations of other modes. The processor can also select one mode for transferring information during a write-back cycle and select another mode of transferring information during other write cycles. After selecting the mode of transferring information, the processor transfers the information in the mode selected as shown in block 952.

Under a fifth embodiment of the present invention, the selector selects between a write-burst mode of transferring information and a non-burst mode of transferring information only for write-back cycles from processor to external memory. Thus, the selector only selects modes for write-back cycles and only affects write-back cycles. Other write cycles are unaffected by the selection made by the selector.

Under a sixth embodiment of the present invention, the BLEN# line of FIG. 6 is coupled to a BLEN# pin. When a first signal state is transmitted by an external device through the BLEN# pin, it indicates that the computer system can accept a write cycle having a bit width larger than the bit width of the bus. In response to the first signal state, the selector selects a write-burst mode of transferring information during a write-back cycle. When a second signal state is transmitted by an external device, it indicates that the computer system cannot accept a write-cycle having a bit width larger than the bit width of the bus. In response to the second signal state, the selector selects a non-burst mode of transferring information during a write-back cycle. When neither a first signal state nor a second signal state is transmitted through the BLEN# pin, the pull-down resistor acts to pull the BLEN# line to a low potential. The selector selects a non-burst mode of transferring information during a write-back cycle.

Under a seventh embodiment of the present invention, processor 104 includes update mode selector 103 and write-back indicator 110 as shown in FIG. 10. Update mode selector 103 selects the mode used to update external memory. Update mode selector 103 can reside in control unit 113 or can reside separately from control unit 113 in processor 104. Write-back indicator 110 indicates the start of a write-back cycle every time a write-back cycle is initiated by processor 104. Write-back indicator 110 can reside in control unit 113 or can reside separately from control unit 113 in processor 104.

Processor 104 can incorporate two or more of the following modes of updating external memory. The first mode of updating external memory is the write-through mode. Under the write-through mode, all memory writes by processor 104 into cache 105 are immediately passed along to external memory. The result is that external memory always contains valid data. The second mode of updating external memory is the buffered write-through mode. Under the buffered write-through mode, processor 104 performs memory writes into cache 105 and then passes the memory writes along to external memory if bus 107 is available. However, when bus 107 is unavailable, cache 105 buffers the memory writes to be passed along. The buffering by cache 105 frees processor 104 to continue its processing operations. When bus 107 becomes available, cache 105 independently completes the writes to external memory from the buffer. The third mode of updating external memory is the write-back mode. Under the write-back mode, processor 104 performs memory writes into cache 105 and a modified dirty (altered) bit is set for all locations affected by the memory writes. Cache 105 does not immediately pass along the memory write even if bus 107 is available. Instead, the information is kept solely in cache 105 until information is requested by another processor 104 in the system or by component 106. At that point, cache 105 updates external memory with the information if the modified dirty (altered) bit is set for that location. Alternatively, the system could issue a cache flush instruction, at which point, cache 105 updates external memory with all information in all locations where the modified dirty (altered) bit is set. Other modes of updating external memory can be incorporated into processor 104 as well.

When update mode selector 103 selects the write-back mode and selector 101 selects a non-burst mode of transferring information, write-back indicator 110 allows computer systems designed for non-burst processors to distinguish between the start of a new write-back from an ongoing write cycle or write-back cycle. The computer systems are able to distinguish between the start of a new write-back from an ongoing write cycle by a signal transmitted on bus 107 by write-back indicator 110. This feature allows the computer systems to perform operations which require the ability to distinguish between the two. One such operation is writing an entire line of four individual write cycles during a write-back to a buffer and transferring the entire line as a whole to memory. The computer system has to distinguish the beginning of a write-back because it indicates the beginning of a line. This operation allows for performance advantages over the alternative of writing data in individual write cycles directly to memory four separate times.

FIG. 11 illustrates in timing diagram form the operation of the processor of the eighth embodiment of the present invention. In this embodiment, selector 101 resides in control unit 113. As shown in FIG. 11, each write of a non-burst write cycle is preceded by an active low address status (ADS#) signal at least one clock before the write. In this embodiment, the ADS# signal precedes the write by one clock cycle. The ADS# signal is asserted on bus 107 by control unit 113 in processor 104 and indicates that processor 104 is ready to transfer data. When the computer system needs information in cache 105, a write-back to external memory has to be performed by processor 104 from cache 105. The computer system initiates a write-back by asserting an active low external address status (EADS#) signal. The EADS# signal indicates that a valid external address has been driven onto the address pins of processor 104. If cache 105 has the information desired by the computer system and the information has been modified, it performs a write-back of the information to external memory. However, the computer system may assert the EADS# signal while processor 104 is in the middle of a write cycle as illustrated in FIG. 11. Because processor 104 is in the middle of a write cycle, it does not perform the write-back until after the write cycle is completed. During the last individual write of the write cycle, processor 104 asserts an active low BLAST# signal in the same clock cycle that the last data packet is transmitted. The BLAST# signal indicates that the write-cycle will be complete after the data packet is transmitted. When processor 104 does perform the write-back, it asserts the same ADS# signal as when it performs an individual write of a write cycle. The computer system is able to distinguish between the start of a new write-back cycle from an ongoing write cycle because write-back indicator 110 asserts an active low CACHE # signal during the same clock the first ADS# of a write-back is asserted. The CACHE# signal indicates that the current write cycle is a write-back cycle. The processor then transfers data in the next clock as shown in FIG. 11. Write-back indicator 110 deasserts the CACHE# signal after the transfer of the first data packet and keeps the CACHE# signal deasserted until the beginning of the next write-back.

Under the ninth embodiment of the present invention, control unit 113 generates a HITM# signal and a W/R# signal. The active low HITM# signal is asserted by control unit 113 after an EADS# signal when the address accompanying the EADS# signal is in cache 105 and has been modified. In this embodiment, HITM# is asserted two clock cycles after the EADS# signal. Thus, the assertion of the HITM# signal indicates a cache hit to a modified line. If the address is not in cache 105 or has not been modified, the HITM# signal is not asserted. After processor 104 initiates a write-back of information associated with the address, HITM# is deasserted as shown in FIG. 11. Here, HITM# is deasserted in the same clock cycle that the write-back is completed. On the other hand, the W/R# signal is asserted high by control unit 113 when processor 104 is performing a read and asserted high when processor 104 is performing a write operation. In this example, W/R#0 is asserted high in the same clock cycle that the first ADS# signal of the write-back is asserted. It is asserted low in the same clock cycle that the write-back is completed.

Under the ninth embodiment, processor 104 asserts and deasserts four signals: ADS#, CACHE#, W/R# and HITM#.

Because of the four signals, the computer system can not only distinguish the start of a new write-back cycle from an ongoing write cycle but also can distinguish between different write-backs. Under the ninth embodiment, processor 104 performs two different types of write-backs. The first type is a replacement write-back. A replacement write-back occurs when processor 104 pulls information from external memory to put in cache 105 while cache 105 is full. To create memory capacity in cache 105 for the new information, processor 104 performs a write-back of existing information in cache 105 to external memory and replaces the existing information with new information from external memory. The second type is an external snoop write-back. An external snoop write-back occurs when another processor or other external component requests information in which the most recent version resides in cache 105. To allow access to the desired information, processor 104 performs a write-back of the information to external memory. The other processor or other external component can then access the information from external memory.

The computer system can determine the beginning of a replacement write-back and an external snoop write-back by examining the signal state of the four signals, ADS#, CACHE#, W/R# and HITM#. When ADS# is asserted low, this indicates to the computer system that the processor is ready for a data transfer. When W/R# is asserted high at the same time, this indicates to the computer system that the data transfer will be a write. When CACHE# is asserted low at the same time, this indicates to the computer system that the write will be the start of a new write-back instead of an ongoing write cycle. If HITM# is found asserted low, this indicates to the computer system that the write-back is an external snoop write-back. On the other hand, if HITM# is found asserted high, this indicates to the computer system that the write-back is a replacement write back.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a novel processor capable of selecting a mode of transferring information by a processor is described.

What is claimed is:

1. A computer system comprising:

a bus having a first bit width;

a processor coupled to said bus, the processor having a selector unit that selects either a write-burst mode or a non-burst mode of transferring information from the processor to the external memory for a write-back cycle; an external device coupled to the bus that transmits a first signal which indicates that the computer system is configured to accept write cycle having a second bit width larger than the first bit width; and the processor further having a pin coupled to receive the first signal from the external device, wherein the selector unit selects the write-burst mode responsive to the first signal; otherwise the selector unit selects the non-write burst mode.

2. The computer system of claim 1 wherein the external device comprises the external memory.

3. The computer system of claim 2 wherein the processor further comprises:

an update mode unit that selects either a write-through, a buffered write-through, or a write-back mode of updating the external memory.

4. The computer system of claim 1 wherein the write-back cycle comprises a single burst transaction of 16 bytes in the write-burst mode of operation.

5. A method of transferring information from a processor to an external memory during a write-back cycle, the processor operating in either a write-burst mode or a non-burst mode of transferring information, the method including the steps of:

transmitting a first signal to the processor from a first device external to the processor, the first signal indicating that a computer system, incorporating the processor and the first external device, is configured to accept a write cycle having a bit width larger than the bit width of a bus coupling the processor and the external memory;

receiving the first signal at the processor via a pin; and responsive to the first signal, selecting the write-burst mode for the transfer of information from the processor to the external memory of the computer system during the write-back cycle.

* * * * *

UNITED STATES PATENT AND TRADEMARK OFFICE
CERTIFICATE OF CORRECTION

PATENT NO.   : 5,669,014
DATED        : September 16, 1997
INVENTOR(S)  : Iyengar et al.

It is certified that error appears in the above-identified patent and that said Letters Patent is hereby corrected as shown below:

In column 1 at line 39 delete "modification" and insert --modified--

In column 3 at line 48 delete "trait" and insert --unit--

In column 4 at line 54 delete "single" and insert --signal--

In column 8 at line 42 delete "dock" and insert --clock--

In column 8 at line 62 delete "W/R#0" and insert --W/R#--

Signed and Sealed this

Twenty-fifth Day of August, 1998

Attest:

BRUCE LEHMAN

*Attesting Officer*   *Commissioner of Patents and Trademarks*